United States Patent
Yong et al.

(10) Patent No.: US 9,324,977 B2
(45) Date of Patent: Apr. 26, 2016

(54) SECONDARY BATTERY

(75) Inventors: Jun-Sun Yong, Yongin-si (KR);
Chang-Seob Kim, Yongin-si (KR);
Sang-Jin Lee, Yongin-si (KR);
Moon-Hong Han, Yongin-si (KR);
Sang-Jin Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1014 days.

(21) Appl. No.: 13/475,797

(22) Filed: May 18, 2012

(65) Prior Publication Data

US 2013/0095363 A1  Apr. 18, 2013

Related U.S. Application Data

(60) Provisional application No. 61/546,279, filed on Oct. 12, 2011.

(51) Int. Cl.
| | | |
|---|---|---|
| *H01M 2/04* | (2006.01) | |
| *H01M 2/06* | (2006.01) | |
| *H01M 2/34* | (2006.01) | |
| *H01M 2/22* | (2006.01) | |

(52) U.S. Cl.
CPC .............. *H01M 2/06* (2013.01); *H01M 2/0473* (2013.01); *H01M 2/34* (2013.01); *H01M 2/0469* (2013.01); *H01M 2/22* (2013.01); *H01M 2200/00* (2013.01)

(58) Field of Classification Search
CPC ... H01M 2/06; H01M 2/0469; H01M 2/0473; H01M 2/22; H01M 2/34; H01M 2200/00

USPC .......................................... 429/120, 178, 179
See application file for complete search history.

(56) References Cited

U.S. PATENT DOCUMENTS

| | | | |
|---|---|---|---|
| 2004/0170887 A1* | 9/2004 | Masumoto et al. ............. 429/61 |
| 2010/0053835 A1 | 3/2010 | Kwag et al. | |
| 2010/0178535 A1 | 7/2010 | Lee | |
| 2011/0064972 A1 | 3/2011 | Park et al. | |

FOREIGN PATENT DOCUMENTS

| | | | |
|---|---|---|---|
| CN | 101667664 A | 3/2010 | |
| EP | 2 164 121 A1 | 3/2010 | |
| JP | 08-031402 | 2/1996 | |
| JP | 2002343315 A * | 11/2002 | .............. H01M 2/04 |
| JP | 2003-187758 | 7/2003 | |
| JP | 2003-187785 | 7/2003 | |
| JP | 2008-016190 | 1/2008 | |

(Continued)

OTHER PUBLICATIONS

JP 2002-343315—Battery Cap Unit (J-Plat Pat English Translation).*

(Continued)

*Primary Examiner* — Patrick Ryan
*Assistant Examiner* — Anne R Dixon
(74) *Attorney, Agent, or Firm* — Lewis Roca Rothgerber Christie LLP

(57) ABSTRACT

A secondary battery including an electrode assembly; a case containing the electrode assembly; a cap plate covering an opening of the case; a safety device on the cap plate; a stiffener on the safety device and holding the safety device against the cap plate; and an electrode terminal electrically connected to the electrode assembly and fixing the safety device and the stiffener to the cap plate.

20 Claims, 6 Drawing Sheets

(56) References Cited

FOREIGN PATENT DOCUMENTS

| KR | 2000-0014826 | * | 3/2000 | ............ H01M 10/02 |
| KR | 10-2004-0020946 | | 3/2004 | |
| KR | 10-2005-0113985 | | 12/2005 | |
| KR | 10-2007-0082943 | | 8/2007 | |
| KR | 10-2009-0056027 | | 6/2009 | |
| KR | 10-2009-0097599 | | 9/2009 | |

OTHER PUBLICATIONS

KR 10-2000-0014826—The device for sealing the electrode terminal of the lithium battery (K-PION English machine translation).*
SIPO Office action dated Jul. 2, 2014, with English translation, for corresponding Chinese Patent application 201210258689.9, (24 pages).
KIPO Notice of Allowance dated Dec. 26, 2013, for corresponding Korean Patent application 10-2012-0078509, (6 pages).
Patent Abstracts of Japan, and English machine translation of Japanese Publication 08-031402 dated Feb. 2, 1996, listed above, (27 pages).
Patent Abstracts of Japan and English Translation of JP 2008-016190 (59 sheets).
EPO Search Report dated Jan. 7, 2013, for corresponding European Patent application 12176772.7, (4 pages).
KIPO Office action dated Jun. 28, 2013, for corresponding Korean Patent application 10-2012-0078509, (5 pages).
Patent Abstracts of Japan, and English machine translation of Japanese Publication 2003-187785 dated Jul. 4, 2003, listed above, (12 pages).

* cited by examiner

SECONDARY BATTERY

CROSS-REFERENCE TO RELATED APPLICATION

This application claims priority to and the benefit of U.S. Provisional Application No. 61/546,279, filed on Oct. 12, 2011 in the United States Patent and Trademark Office, the entire content of which is incorporated herein by reference.

BACKGROUND

1. Field

Aspects of embodiments of the present invention relate to a secondary battery.

2. Description of the Related Art

Technologies for mobile devices, such as mobile phones or notebook computers, have been constantly developed and the production of such devices has continually increased. Thus, demand for secondary batteries as an energy source has increased significantly. For safety reasons, a secondary battery includes a safety device for performing a protection operation, such as detecting a malfunction, for example, overheating or flow of excess current, or blocking a current flow.

SUMMARY

According to an aspect of embodiments of the present invention, a secondary battery includes a safety device having a simple installation structure.

According to another aspect of embodiments of the present invention, in a secondary battery, an installation structure of a safety device enables precise detection of an inner temperature of the secondary battery.

According to an embodiment of the present invention, a secondary battery includes: an electrode assembly; a case containing the electrode assembly; a cap plate covering an opening of the case; a safety device on the cap plate; a stiffener on the safety device and holding the safety device against the cap plate; and an electrode terminal electrically connected to the electrode assembly and fixing the safety device and the stiffener to the cap plate.

The safety device may include a body portion, and a first lead extending from a side of the body portion.

The electrode terminal may extend through a through-hole of the first lead and a through-hole of the stiffener and fix the first lead and the stiffener to the cap plate by compression.

The stiffener may have a cantilever beam structure including a fixed end at a first position corresponding to the first lead, and a free end at a second position corresponding to the body portion. The stiffener may press the body portion against the cap plate at the second position. The first position may be offset with respect to a central position of the cap plate.

The stiffener may extend substantially parallel to the first lead.

The safety device may further include a second lead extending from another side of the body portion.

In one embodiment, the cap plate includes a conductive member and first and second insulating portions, and the body portion is arranged on the conductive member, and the first and second leads are arranged on the first and second insulating portions, respectively. The conductive member and the first and second insulating portions may be integrally formed.

At least one of the conductive member or the first and second insulating portions may have a dovetail-shaped groove, and the other of the conductive member or the first and second insulating portions may have a protrusion in the groove and coupling the other of the conductive member or the first and second insulating portions to the at least one of the conductive member or the first and second insulating portions.

The cap plate may include a conductive member, and a heat transmission member between and contacting the body portion and the conductive member. The heat transmission member may include a flexible and thermally conductive material. The heat transmission member may include an adhesive coupling the body portion to the conductive member. The heat transmission member may include silicone.

The electrode terminal may include a first flange on the stiffener, and a second flange coupled to an electrode tap of the electrode assembly. A width of the second flange may be greater than a width of the first flange. The electrode tap may be directly welded to the second flange.

The stiffener may include a thermally conductive material. The stiffener may include INVAR (INVAR is a registered trademark of Imphy Alloy, France for a nickel-iron alloy known generically as FeNi36 or 64FeNi) or carbon steel.

In one embodiment, the cap plate includes a conductive member having a through-hole, the electrode terminal protruding through the through-hole, and an insulating portion extending through the through-hole and including a first portion extending beyond the through-hole on a first side of the cap plate, and a second portion extending beyond the through-hole on a second side of the cap plate opposite the first side, the first and second portions being integrally formed with a portion of the insulating portion extending in the through-hole from the first side to the second side.

The cap plate may have a recess receiving a portion of the safety device therein.

According to another embodiment of the present invention, a secondary battery includes: a cap plate that seals a case housing an electrode assembly; a safety device disposed on the cap plate; a stiffener that compresses the safety device against the cap plate; and an electrode terminal that passes through a first lead of the safety device and the stiffener together to fix the first lead and the stiffener on the cap plate.

In one embodiment, the electrode terminal fixes the first lead and the stiffener by compression on a first position, and the first lead and the stiffener extend from the first position toward a second position.

In one embodiment, the stiffener extends parallel to the first lead and covers the first lead.

In one embodiment, a safety device body is disposed on the second position, the first lead is connected to the safety device body, and the stiffener compresses the safety device body against the cap plate.

In one embodiment, the safety device body may be fixed between the cap plate and the stiffener by compression.

In one embodiment, a heat transmission member may be interposed between the safety device body and the cap plate.

In one embodiment, the heat transmission member may include a heat transmission silicone.

In one embodiment, the first position may be eccentric with respect to a central position of the cap plate.

In one embodiment, the stiffener may include a thermally conductive material.

In one embodiment, the stiffener may include an INVAR (INVAR is a registered trademark of Imphy Alloys, France for a nickel-iron alloy known generically as FeNi36 or 64FeNi or carbon-steel.

In one embodiment, the electrode terminal is assembled passing through the cap plate, and an upper end of the electrode terminal which protrudes from the cap plate forms an upper flange that fixes the first lead and the stiffener by compression.

In one embodiment, a lower end of the electrode terminal forms a lower flange that forms a surface contact with the electrode assembly.

In one embodiment, an area of the lower flange is wider than an area of the upper flange.

In one embodiment, the cap plate may be a insert molded product in which a conductive member conforms to and is integrally formed with a first insulating portion for supporting the first lead.

In one embodiment, the electrode terminal may fix the first lead and the stiffener on the first insulating portion by compression by passing through the first lead, the stiffener, and the first insulating portion together.

In one embodiment, the first insulating portion extends in a passing direction of the electrode terminal, and upper and lower ends of the electrode terminal arranged along the passing direction of the electrode terminal extend in a surface direction of the cap plate.

According to an aspect of embodiments of the present invention, in a secondary battery, a safety device is fixed by compression after insertion of an electrode terminal, and thus welding between the safety device and the electrode terminal may not be needed. According to another aspect of embodiments of the present invention, the safety device is integrally formed with a cap plate. Thus, a secondary battery can be assembled via a simple operation.

According to another aspect of embodiments of the present invention, due to the use of a stiffener that presses the safety device against the cap plate by compression, the safety device precisely detects an inner temperature of a secondary battery, and thus, when an abnormal operation occurs, the safety device may readily perform a safety operation. Also, through the stiffener that is fixed together with the safety device by compression, the coupling strength and mechanical strength of the safety device is reinforced and the safety device is effectively protected.

According to another aspect of embodiments of the present invention, due to the configuration of a heat transmission member between the safety device and the cap plate, the safety device may precisely detect an inner temperature of a secondary battery.

BRIEF DESCRIPTION OF THE DRAWINGS

The accompanying drawings, together with the specification, illustrate some exemplary embodiments of the present invention, and, together with the description, serve to explain aspects and principles of the present invention.

DETAILED DESCRIPTION

Figure 1:
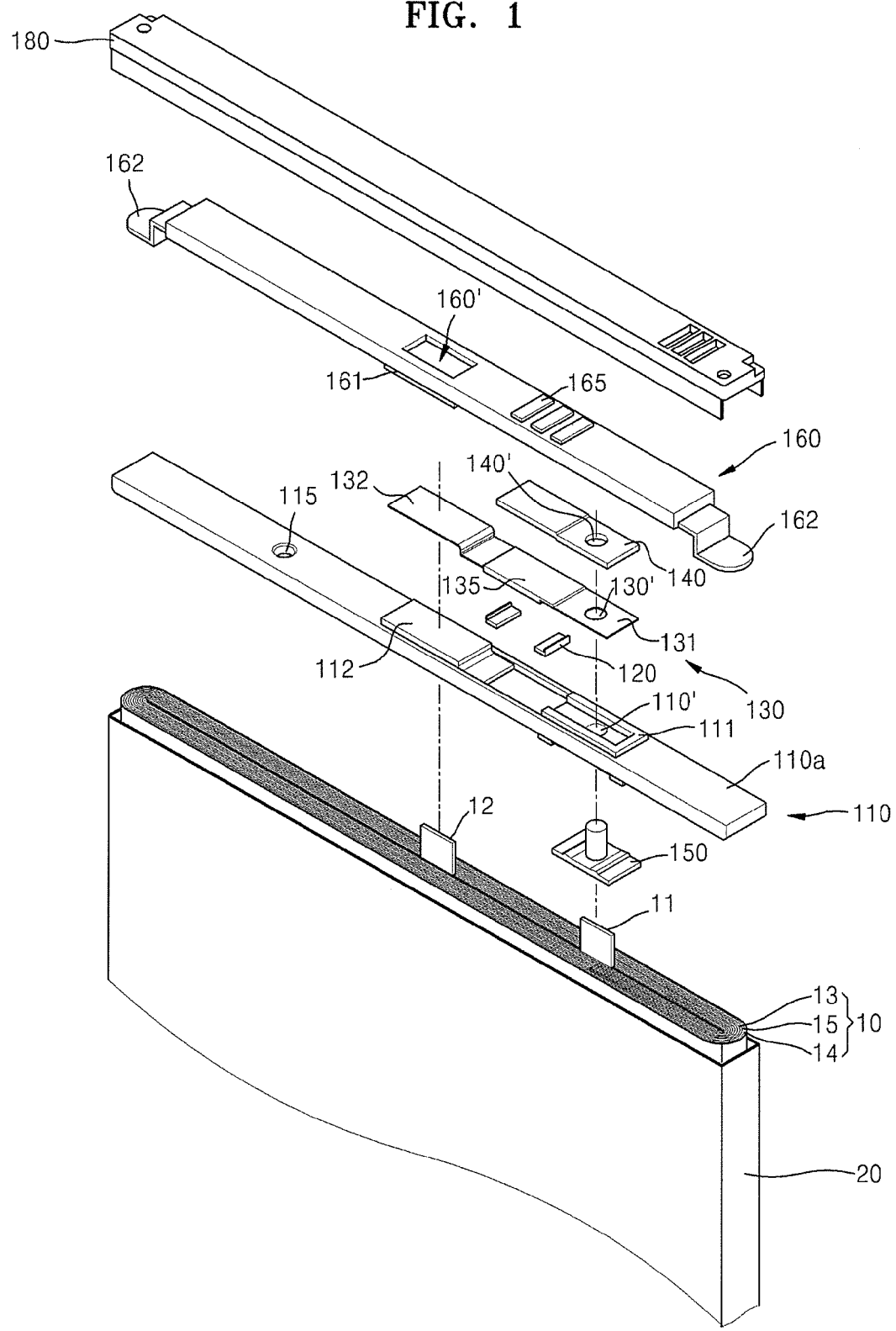
FIG. 1 is an exploded perspective view of a secondary battery according to an embodiment of the present invention.

The present invention will be described more fully hereinafter with reference to the accompanying drawings, in which some exemplary embodiments of the invention are shown and described. However, as those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is an exploded perspective view of a secondary battery according to an embodiment of the present invention. Referring to FIG. 1, the secondary battery includes a case 20 that houses an electrode assembly 10, a cap plate 110 that closes an open end of the case 20, and a safety device 130 that is mounted on the cap plate 110 and performs a safety operation in response to an abnormal operation, such as overheating or flow of excess current.

The electrode assembly 10 may be formed by interposing a separator 15 between a first electrode plate 13 (e.g., a negative electrode plate) and a second electrode plate 14 (e.g., a positive electrode plate) to separate the first electrode plate 13 from the second electrode plate 14, and then winding the first electrode plate 13, the second electrode plate 14, and the separator 15 in a jelly roll shape. Each of the first electrode plate 13 and the second electrode plate 14 includes an electrode active material. The first electrode plate 13 and the second electrode plate 14 may respectively include first and second electrode taps 11 and 12 that allow electrical charges formed due to a chemical reaction to flow out of the electrode assembly 10. For example, in one embodiment, the first and second electrode taps 11 and 12 respectively function as a negative electrode tap and a positive electrode tap.

The electrode assembly 10 may be immersed in an electrolyte (not shown) inside the case 20. An opening of the case 20 may be covered by the cap plate 110 after the electrode assembly 10 is placed therein. Contact portions of the cap plate 110 and the case 20 may be firmly coupled to each other, such as by laser welding.

In one embodiment, the first electrode tap 11 of the electrode assembly 10 contacts an electrode terminal 150 that protrudes through the cap plate 110, and the second electrode tap 12 of the electrode assembly 10 contacts the cap plate 110. In one embodiment, the electrode terminal 150 is coupled to the cap plate 110 while being insulated from the cap plate 110, and protrudes through the cap plate 110 to electrically connect the electrode assembly 10 to the safety device 130.

The safety device 130, in one embodiment, is disposed on the cap plate 110 and may regulate or block charge and discharge currents during malfunctioning, for example, during an occurrence of overheating or excess current. The safety device 130 may have a positive temperature coefficient (PTC) and may include a fuse, a current-blocking device, a bi-metal, or the like. The safety device 130, in one embodiment, includes a safety device body 135 and first and second leads 131 and 132 extending in opposite directions from the safety device body 135.

The cap plate 110 may have a safety vent 115 of a rupturable type such that when an internal pressure of the case 20 exceeds a certain pressure (e.g., a predetermined pressure), a gas discharge path is provided.

In one embodiment, a circuit portion 160 may be mounted on the cap plate 110. The circuit portion 160 may include an interconnection pattern (not shown) that enables electrical connection with an external device (not shown) and forms a charge and discharge current path. On a surface of the circuit portion 160, an outer connection terminal 165 for electrical connection with an external device may be formed, and first and second connection members 161 and 162 may be disposed on another surface. In one embodiment, the first connection member 161 contacts the second lead 132 of the safety device 130, which functions as a negative electrode terminal. For example, by using a welding electrode (not shown) inserted through an opening 160' of the circuit portion 160, the first connection member 161 may be coupled to the second lead 132 by welding. The second connection member 162, in one embodiment, contacts the cap plate 110 and functions as a positive electrode terminal.

The circuit portion 160 may function as a protection member for preventing or substantially preventing an occurrence of an overcharge, excess current, overdischarge, or the like, together with the safety device 130. In one embodiment, an upper cover 180 housing the circuit portion 160 is disposed on the cap plate 110.

Figure 2:
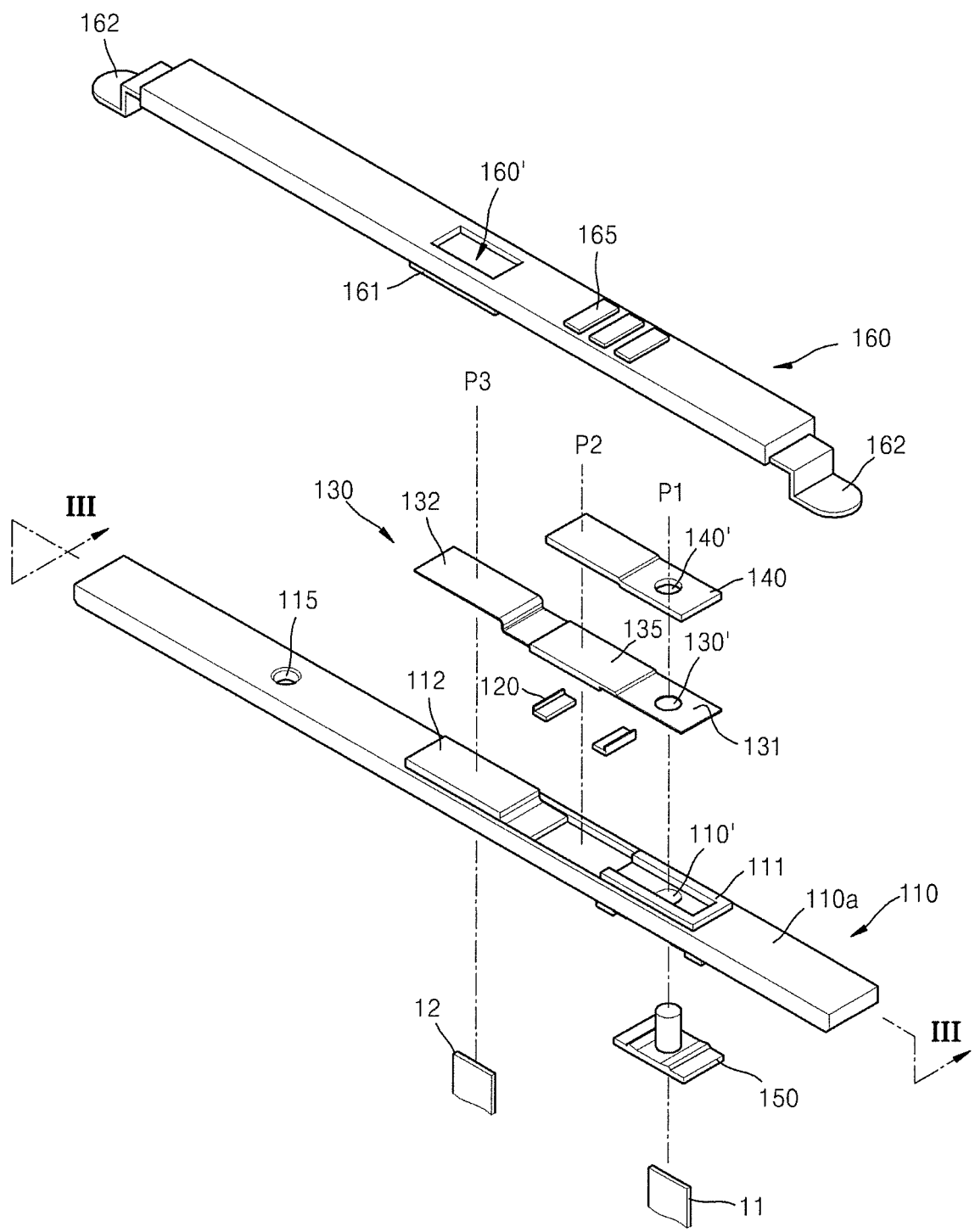
FIG. 2 is an enlarged exploded perspective view of a portion of the secondary battery of FIG. 1.
Figure 3:
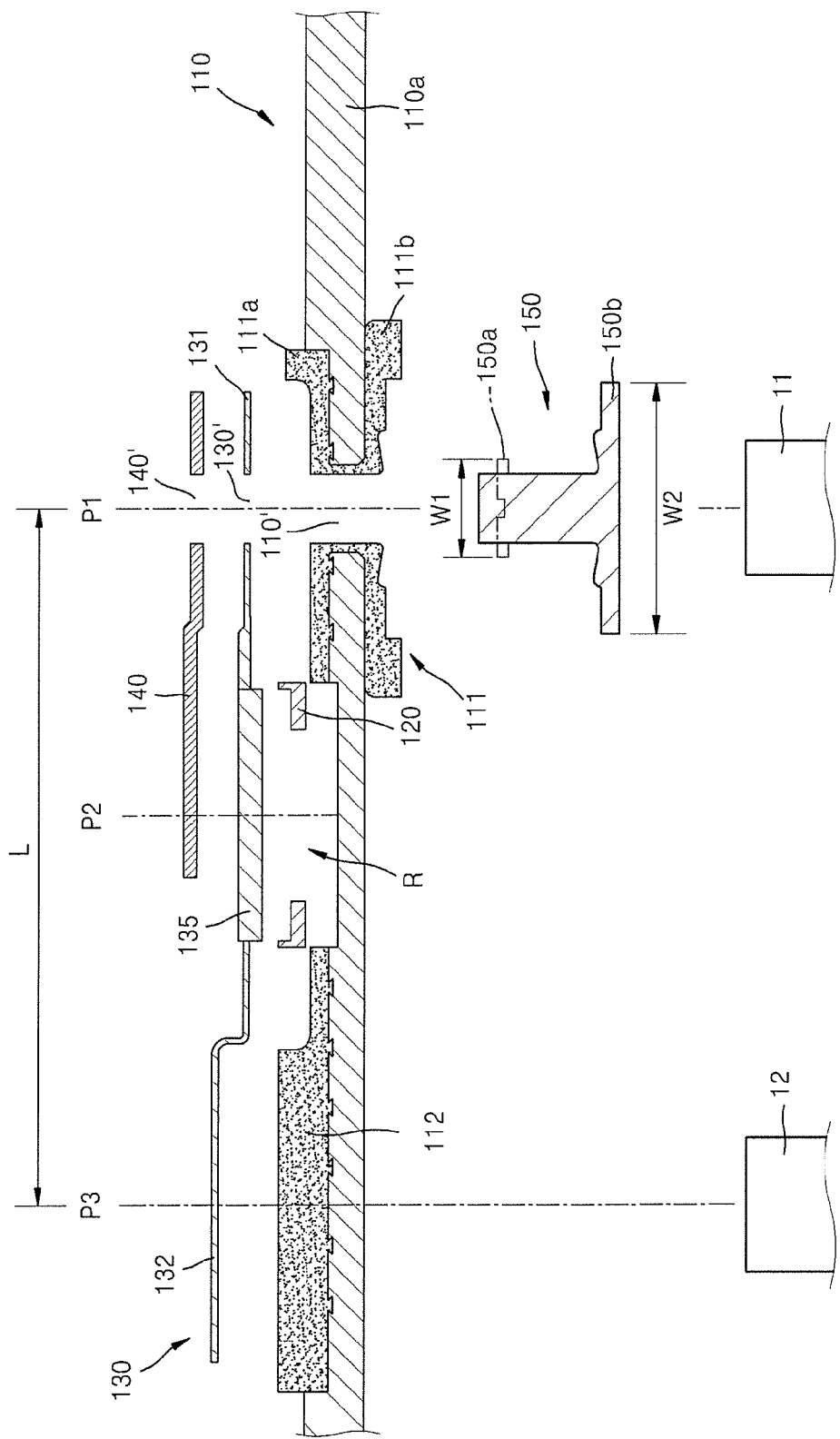
FIGS. 3 to 5 are cross-sectional views of a portion of the secondary battery of FIG. 1, taken along the line III-III of FIG. 2.
Figure 4:
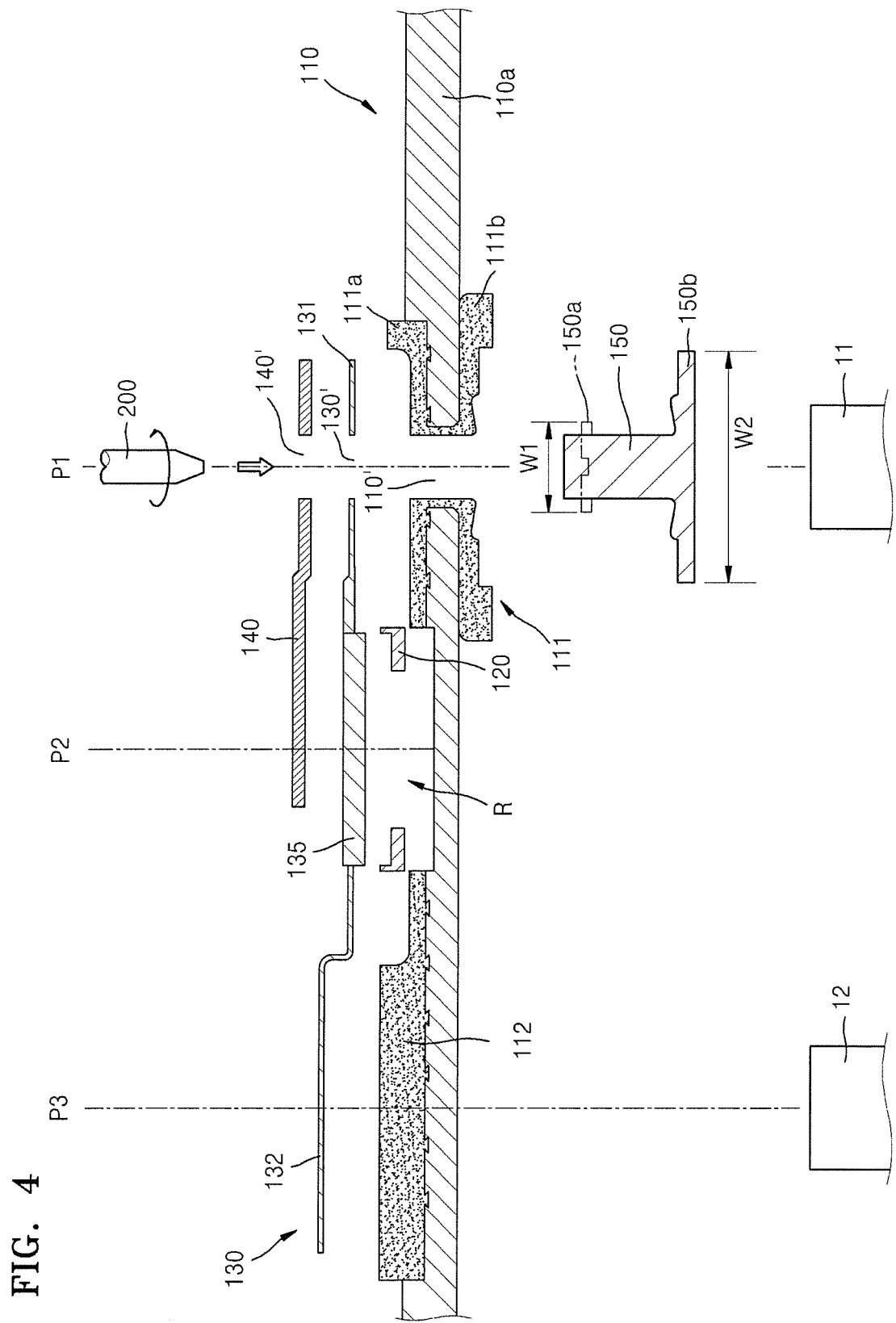
Figure 5:
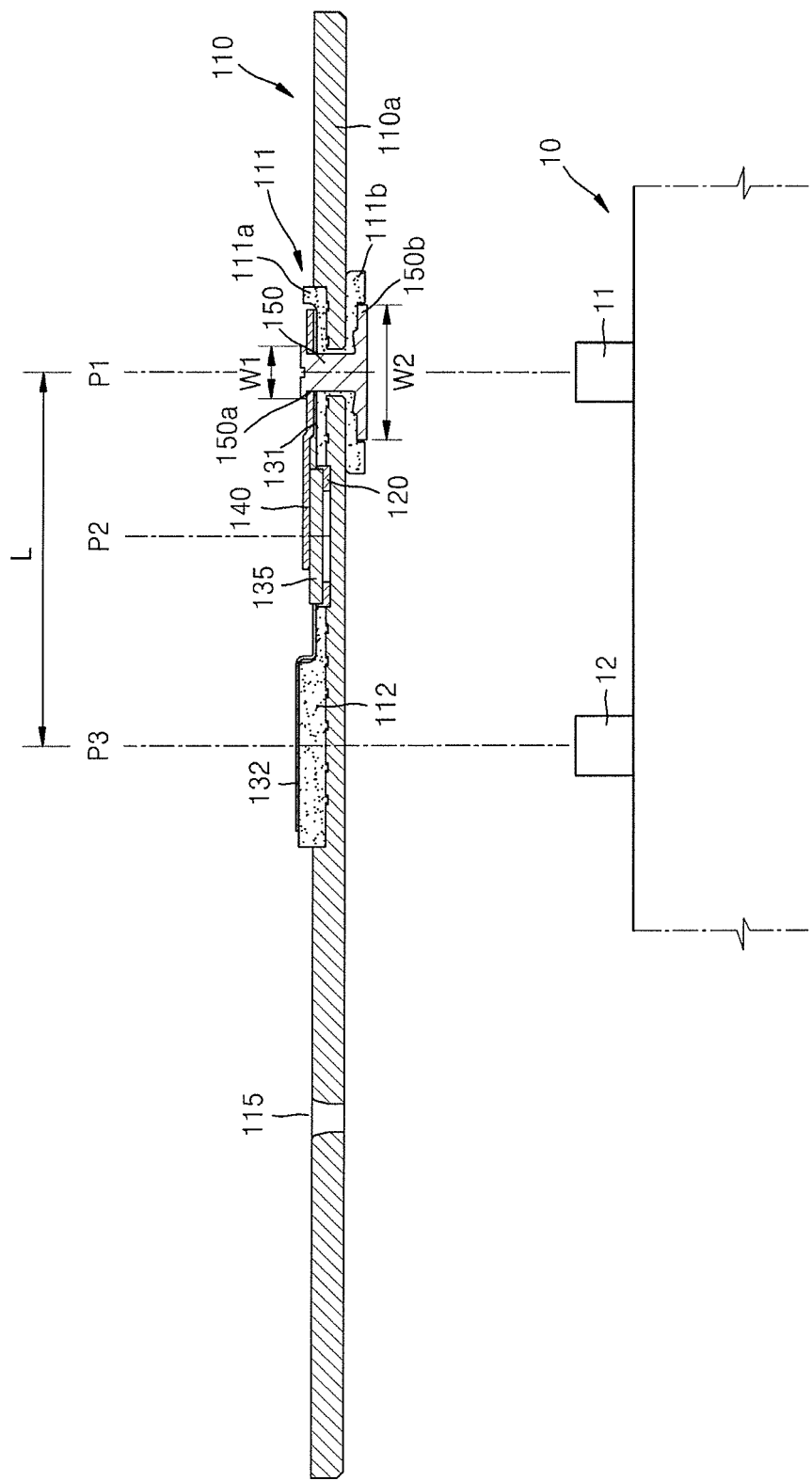

FIG. 2 is an enlarged exploded perspective view of a portion of the secondary battery of FIG. 1. FIGS. 3 to 5 are cross-sectional views of a portion of the secondary battery of FIG. 1, taken along the line III-III of FIG. 2.

Referring to FIG. 2, in one embodiment, the electrode terminal 150 is assembled at a first position P1 of the cap plate 110. In one embodiment, the electrode terminal 150 is assembled passing through the cap plate 110 by insertion, and electrically connects the electrode assembly 10 and the safety device 130 which are disposed on opposite sides of the cap plate 110.

In one embodiment, the electrode terminal 150 is inserted into a through-hole 110' of a first insulating portion 111 of the cap plate 110. For example, as illustrated in FIG. 4, the electrode terminal 150 may be inserted from a lower surface of the first insulating portion 111, and an upper portion of the electrode terminal 150 which protrudes from an upper surface of the first insulating portion 111 may be processed by caulking, spinning, or riveting to form an upper flange 150a that is widened toward a circumference of the electrode terminal 150. The upper flange 150a may fix the electrode terminal 150 on the cap plate 110 by compression. The upper flange 150a may be formed by applying a process tool 200 (see FIG. 4) to an upper end of the electrode terminal 150.

In one embodiment, the first lead 131 of the safety device 130 has a through-hole 130', and the electrode terminal 150 is inserted into the through-hole 130' of the first lead 131. The first lead 131 may be fixed by the electrode terminal 150 by compression. In one embodiment, the electrode terminal 150 fixes the first lead 131 on the cap plate 110 by compression and forms an electrical contact with the first lead 131. For example, the electrode terminal 150 may be inserted into the through-hole 130' of the first lead 131, and the first lead 131 may be fixed on the cap plate 110 by the upper flange 150a of the electrode terminal 150. In this case, welding between the electrode terminal 150 and the safety device 130 may not be needed. Also, the first lead 131 of the safety device 130 extends from the first position P1 toward a second position P2 and is connected to the safety device body 135 disposed at the second position P2.

The electrode terminal 150, in one embodiment, fixes a stiffener 140 together with the first lead 131. The stiffener 140 may have a through-hole 140' corresponding to the electrode terminal 150. In one embodiment, the electrode terminal 150 is sequentially inserted into the first lead 131 and the stiffener 140 and, then, an upper portion of the electrode terminal 150 is processed (e.g., by caulking) to form the upper flange 150a having a rivet shape, for example. Thus, the first lead 131 and the stiffener 140 into which the electrode terminal 150 is inserted may be fixed on the cap plate 110 by compression.

The stiffener 140, in one embodiment, extends parallel to the first lead 131 of the safety device 130, and may extend from the first position P1 where the electrode terminal 150 is located toward the second position P2 where the safety device body 135 is located. At the second position P2, the stiffener 140 may compress the safety device body 135 such that the safety device body 135 is held or pressed against the cap plate 110.

In one embodiment, the safety device body 135 and the cap plate 110 are pressed or held against each other due to compression applied by the stiffener 140, and an inner temperature of the secondary battery may thereby be precisely detected, and an abnormal operation may be accurately detected to perform a safety operation, such as current interruption. At the second position P2, the safety device body 135 may be firmly held in position between the stiffener 140 and the cap plate 110.

The stiffener 140, in one embodiment, reinforces a coupling strength of the first lead 131 by being pressed by the electrode terminal 150 together with the first lead 131 while overlapping the first lead 131. Due to the use of the stiffener 140, the first lead 131 is interposed between the stiffener 140 and the cap plate 110 and is more firmly held in position therebetween, and, also, the coupling strength of the first lead 131 may be increased. Also, because the stiffener 140 extends parallel to the first lead 131, the stiffener 140 reinforces rigidity of the first lead 131 and protects the first lead 131.

The stiffener 140 may have a cantilever beam structure including a fixed end that is located at the first position P1 and a free end that is located at the second position P2. The stiffener 140, in one embodiment, is formed of a material which resists excess warp deformation to effectively compress the safety device body 135 and which has a rigidity that is sufficient to reinforce the rigidity of the first lead 131 and increase the coupling strength of the first lead 131.

The stiffener 140, in one embodiment, is formed of a thermally conductive material and, thus, may transmit heat of the electrode terminal 150 at the first position P1 to the safety device body 135 at the second position P2, thereby allowing the safety device body 135 to precisely detect a heating state or temperature of the secondary battery. Heat may be focused on the electrode terminal 150 because the electrode terminal 150 forms a current path for charge and discharge currents. Accordingly, due to the heat transmission of the stiffener 140 to the safety device body 135, an abnormal operation may be readily detected and a safety operation may be performed. The stiffener 140, in one embodiment, is formed of a material having mechanical rigidity and thermal conductivity, such as INVAR (INVAR is a registered trademark of Imphy Alloys, France for a nickel-iron alloy known generically as FeNi36 or 64FeNi) or carbon steel, for example. In one embodiment, for example, the stiffener 140 may be formed of high-carbon steel. However, the present invention is not limited thereto.

In one embodiment, a heat transmission member 120 is interposed between the safety device body 135 and the cap plate 110 to thermally connect the safety device body 135 and the cap plate 110.

In one embodiment, the heat transmission member 120 contacts the safety device body 135 and the cap plate 110 between the safety device body 135 and the cap plate 110 to form a heat transmission path therebetween, and absorb process tolerances to allow the stiffener 140 to effectively compress the safety device body 135. That is, the heat transmission member 120 may prevent or substantially prevent formation of a space between the stiffener 140 and the safety device body 135 due to process tolerances. In one embodiment, the heat transmission member 120 is formed of a flexible, or compressible, and thermally conductive material. In one embodiment, the heat transmission member 120 may include an adhesive material for firmly contacting the safety device body 135 and the cap plate 110. In one embodiment, for example, the heat transmission member 120 may be formed of a composite material, such as a matrix sheet containing thermally conductive particles.

In one embodiment, the heat transmission member 120 may be formed by application of thermally conductive silicone. For example, thermally conductive silicone may be applied at a position on which the safety device body 135 is to be mounted, and then, another heat transmission member having a sheet shape may be disposed thereon.

In one embodiment, an insulating coating or an insulating film (not shown) may be formed on a surface of the safety device body 135, and these insulating materials may be integrated as an outer material with the safety device body 135.

The electrode terminal 150, in one embodiment, protrudes from the cap plate 110 to effectively fix the first lead 131 and the stiffener 140 which are disposed on the cap plate 110 by compression. As shown in FIG. 3, the first position P1 of the electrode terminal 150 may be a position offset by a distance "L" and eccentric with respect to a central portion, or a third position P3, of the cap plate 110. In one embodiment, because the electrode terminal 150 is formed at the first position P1 eccentric with respect to the third position P3 of the cap plate 110, an installation space on the cap plate 110 may be effectively used, and, for example, electrical devices for controlling charge and discharge operations may be compactly installed.

In one embodiment, as described above, the electrode terminal 150 is arranged at the offset first position P1 of the cap plate 110, and a negative electrode terminal may be formable on the third position P3 of the cap plate 110 by using the safety device 130 that extends from the first position P1 to the third position P3. That is, the safety device 130 may extend from the first position P1 to the central portion, or the third position P3, of the cap plate 110 such that the second lead 132 may form a negative electrode terminal at the third position P3 of the cap plate 110.

The electrode terminal 150 allows the electrode assembly 10 and the safety device 130 disposed on opposite sides of the cap plate 110 to be electrically connected to each other. In one embodiment, the electrode terminal 150 is electrically connected to the first lead 131 of the safety device 130 through the upper flange 150a and is electrically connected to the electrode assembly 10 through a lower flange 150b.

The lower flange 150b of the electrode terminal 150, in one embodiment, has a wider area than the upper flange 150a and provides a wide area for welding to the electrode assembly 10. That is, a width or radius W2 of the lower flange 150b may be greater than a width or radius W1 of the upper flange 150a. Due to the wider area of the lower flange 150b relative to the upper flange 150a, a terminal plate for increasing a welding area between the electrode terminal 150 and the electrode assembly 10 may be omitted.

In one embodiment, the lower flange 150b of the electrode terminal 150 has a relatively large area, and the first electrode tap 11 may be directly welded to the electrode terminal 150. Thus, a separate member for increasing a welding area may not be needed. Also, due to the direct welding of the first electrode tap 11 to the electrode terminal 150 without a separate member, a charge and discharge path is shortened and a loss due to resistance is reduced.

The safety device 130, in one embodiment, includes the safety device body 135 and the first and second leads 131 and 132 extending on opposite sides of the safety device body 135. In one embodiment, the first lead 131 of the safety device 130 is fixed on the electrode terminal 150 by compression at the first position P1, and the second lead 132 of the safety device 130 is exposed on the cap plate 110 at the third position P3 to form a negative electrode terminal.

In one embodiment, a charge and discharge current path includes the first electrode tap 11 of the electrode assembly 10, the electrode terminal 150, and the safety device 130, and the second lead 132 of the safety device 130 forms a negative electrode terminal.

In one embodiment, the first and second leads 131 and 132 of the safety device 130 are supported by and insulated by the first insulating portion 111 and a second insulating portion 112 of the cap plate 110. The first and second insulating portions 111 and 112 may be formed on a portion of a conductive member 110a of the cap plate 110 which forms a skeleton of the cap plate 110 or may be formed passing through the conductive member 110a.

The first insulating portion 111 is formed at the first position P1 where the electrode terminal 150 is assembled, and supports and insulates the electrode terminal 150 and the first lead 131 to prevent or substantially prevent a short circuit between the electrode terminal 150 and the first lead 131 and the conductive member 110a. That is, the first insulating portion 111 prevents or substantially prevents a short circuit between a positive electrode and a negative electrode, that is, between the first lead 131 that is electrically connected to the first electrode tap 11 of the electrode assembly 10 and the conductive member 110a that is connected to the second electrode tap 12 of the electrode assembly 10.

The first insulating portion 111, in one embodiment, has the through-hole 110' formed therethrough into which the electrode terminal 150 is inserted, and may extend along a portion of the cap plate 110 surrounding the through-hole 110' to support the electrode terminal 150 and the first lead 131 while insulating the electrode terminal 150 and the first lead 131. In one embodiment, the first insulating portion 111 extends along the through-hole 110', and upper and lower ends 111a and 111b of the first insulating portion 111 arranged along a passing direction of the electrode terminal 150 extend in a surface direction of the cap plate 110. In one embodiment, the upper end 111a of the first insulating portion 111 insulates the first lead 131, and the lower end 111b insulates the lower flange 150b of the electrode terminal 150. In one embodiment, a portion of the first insulating portion 111 disposed in the through-hole 110' is integrated, or integrally formed, with the upper and lower ends 111a and 111b.

In one embodiment, in addition to the insulating function of the first insulating portion 111 with respect to the electrode terminal 150, the first insulating portion 111 functions as a gasket for sealing the through-hole 110' through which the electrode terminal 150 passes. That is, the first insulating portion 111, in one embodiment, seals the through-hole 110' while surrounding the electrode terminal 150 to prevent or substantially prevent leakage of an electrolyte or passage of external impurities through the through-hole 110'. In one embodiment, the electrode terminal 150 is forcedly inserted into the through-hole 110' of the first insulating portion 111. The first insulating portion 111 may be formed of a resin-based material, the first insulating portion 111 may firmly contact the circumference of the electrode terminal 150.

The second insulating portion 112, in one embodiment, supports the second lead 132 of the safety device 130 while insulating the second lead 132. The second insulating portion 112 may be formed at the third position P3 (i.e. the central portion) of the cap plate 110. The second insulating portion 112 is formed on the surface of the conductive member 110a that forms a skeleton of the cap plate 110, and the second lead 132 of the safety device 130 is disposed on the second insulating portion 112. The second lead 132 may be electrically connected to the first electrode tap 11 of the electrode assembly 10 through the electrode terminal 150 and may form a negative electrode terminal. The first and second insulating portions 111 and 112 may be formed of the same material. For example, in one embodiment, the first and second insulating portions 111 and 112 may be formed of a resin-based material.

The safety device 130, in one embodiment, includes the safety device body 135 and the first and second leads 131 and 132 extending on opposite sides of the safety device body 135. The first and second leads 131 and 132 of the safety device 130 may be insulated by and supported on the first and second insulating portions 111 and 112, respectively, of the cap plate 110. The safety device body 135 may be disposed in a recess R between the first and second insulating portions 111 and 112. In one embodiment, the safety device body 135 is disposed on a portion of the conductive member 110a on which the first and second insulating portions 111 and 112 are not formed, and the safety device body 135 may precisely sense an inner temperature of the secondary battery.

The cap plate 110, in one embodiment, is a plate formed by integrating two materials having different electrical characteristics, that is, a plate manufactured by integrally forming the conductive member 110a that is electrically conductive and the first and second insulating portions 111 and 112 that are electrically insulative.

In one embodiment, the conductive member 110a may be connected to the second electrode tap 12 of the electrode assembly 10 to form a positive electrode terminal, and forms a skeleton of the cap plate 110. For example, the second electrode tap 12 of the electrode assembly 10 may be welded to a lower surface of the conductive member 110a, and an exposed portion of the conductive member 110a may function as a positive electrode terminal.

The first and second insulating portions 111 and 112 may be formed on a surface of the conductive member 110a or may pass through the conductive member 110a, Thus, a short circuit between a positive electrode and a negative electrode, that is, between the electrode terminal 150 connected to the first electrode tap 11 of the electrode assembly 10 and the conductive member 110aconnected to the second electrode tap 12 of the electrode assembly may be prevented or substantially prevented. In one embodiment, the first and second insulating portions 111 and 112 conform to and are integrally formed with the conductive member 110a, and assembling a separate insulating member on the cap plate 110 is not needed. In one embodiment, the conductive member 110a and the first and second insulating portions 111 and 112 form an integrated unit module, and the assembly process for a secondary battery is thereby simplified.

Figure 6:
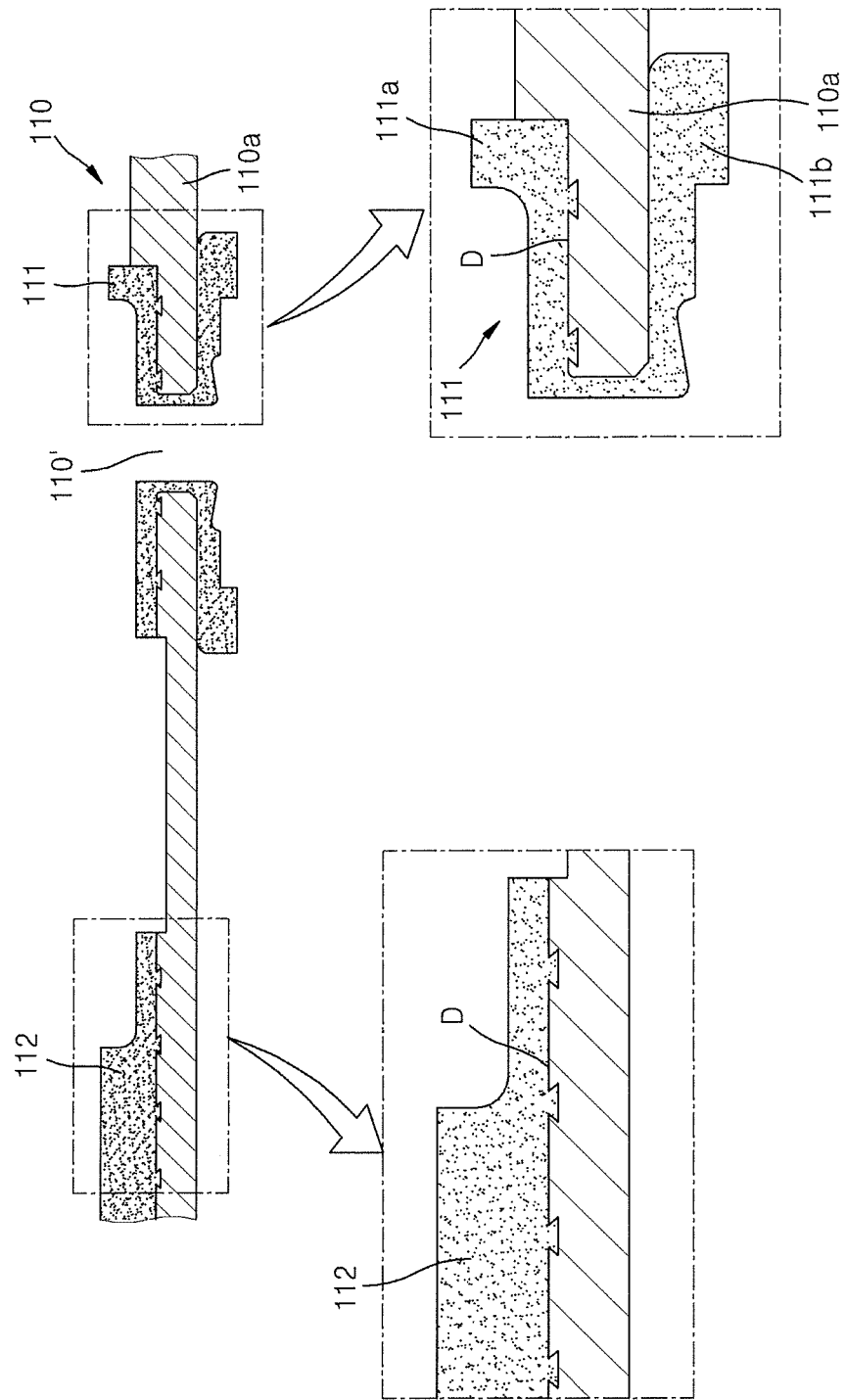
FIG. 6 is a cross-sectional view of a portion of a cap plate of the secondary battery of FIG. 1.

FIG. 6 is a cross-sectional view of a portion of the cap plate 110. Referring to FIG. 6, at interfaces of the conductive member 110a and the first and second insulating portions 111 and 112, a dovetail-shaped uneven pattern "D" may be formed to function as a stopper structure for preventing or substantially preventing separation thereof, thereby firmly coupling the first and second insulating portions 111 and 112 and the conductive member 110a to each other.

The cap plate 110, in one embodiment, may be formed by insert molding. That is, in one embodiment, the conductive member 110a may be temporally fixed at a predetermined position inside a mold frame (not shown), and, then, a molten molding resin (not shown) is loaded into the mold frame to form the cap plate 110 that includes the conductive member 110a and the first and second insulating portions 111 and 112 which are all integrated as one body. In this case, the first and second insulating portions 111 and 112 may be formed of the same material, such as a resin-based material.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof. Descriptions of features or aspects within each embodiment should typically be considered as available for other similar features or aspects in other embodiments.

What is claimed is:

1. A secondary battery comprising:
   an electrode assembly;
   a case containing the electrode assembly;
   a cap plate covering an opening of the case;
   a safety device on the cap plate;
   a stiffener on the safety device and holding the safety device against the cap plate; and
   an electrode terminal electrically connected to the electrode assembly and fixing the safety device and the stiffener to the cap plate,
   wherein the safety device comprises a body portion, and a first lead extending from a side of the body portion and the stiffener is on each of the body portion and the lead, and
   wherein the electrode terminal extends through a through-hole of the first lead and a through-hole of the stiffener and fixes the first lead and the stiffener to the cap plate by compression.

2. The secondary battery of claim 1, wherein the stiffener has a cantilever beam structure including a fixed end at a first position corresponding to the first lead, and a free end at a second position corresponding to the body portion.

3. The secondary battery of claim 2, wherein the stiffener presses the body portion against the cap plate at the second position.

4. The secondary battery of claim 2, wherein the first position is offset with respect to a central position of the cap plate.

5. The secondary battery of claim 1, wherein the stiffener extends in a same direction as the first lead.

6. The secondary battery of claim 1, wherein the safety device further comprises a second lead extending from another side of the body portion.

7. The secondary battery of claim 6,
   wherein the cap plate comprises a conductive member and a first insulating portion and a second insulating portion, and
   wherein the body portion is arranged on the conductive member, and the first and second leads are arranged on the first insulating portion and the second insulating portion, respectively.

8. The secondary battery of claim 7, wherein the conductive member and the first and second insulating portions are integrally formed.

9. The secondary battery of claim 7, wherein at least one of the conductive member or the first and second insulating portions has a dovetail-shaped groove, and the other of the conductive member or the first and second insulating portions has a protrusion in the dovetail-shaped groove and coupling the other of the conductive member or the first and second insulating portions to the at least one of the conductive member or the first and second insulating portions.

10. The secondary battery of claim 1, wherein the cap plate comprises a conductive member, and a heat transmission member between and contacting the body portion and the conductive member.

11. The secondary battery of claim 10, wherein, the heat transmission member comprises a flexible and thermally conductive material.

12. The secondary battery of claim 10, wherein the heat transmission member comprises an adhesive coupling the body portion to the conductive member.

13. The secondary battery of claim 10, wherein the heat transmission member comprises silicone.

14. The secondary battery of claim 1, wherein the electrode terminal comprises a first flange on the stiffener, and a second flange coupled to an electrode tap of the electrode assembly.

15. The secondary battery of claim 14, wherein a width of the second flange is greater than a width of the first flange.

16. The secondary battery of claim 14, wherein the electrode tap is directly welded to the second flange.

17. The secondary battery of claim 1, wherein the stiffener comprises a thermally conductive material.

18. The secondary battery of claim 1, wherein the stiffener comprises a nickel-iron alloy or carbon steel.

19. The secondary battery of claim 1, wherein the cap plate comprises:
   a conductive member having a through-hole, the electrode terminal protruding through the through-hole; and
   an insulating portion extending through the through-hole and comprising a first portion extending beyond the through-hole on a first side of the cap plate, and a second portion extending beyond the through-hole on a second side of the cap plate opposite the first side, the first and second portions being integrally formed with a portion of the insulating portion extending in the through-hole from the first side to the second side.

20. The secondary battery of claim 1, wherein the cap plate has a recess receiving a portion of the safety device therein.

* * * * *